United States Patent [19]

Talley et al.

[11] Patent Number: 4,686,150

[45] Date of Patent: Aug. 11, 1987

[54] ELECTROMAGNETIC RADIATION REFLECTOR STRUCTURE AND METHOD FOR MAKING SAME

[75] Inventors: Eric Talley, Allentown, N.J.; Raj N. Gounder, Kent, Wash.

[73] Assignee: RCA Corporation, Princeton, N.J.

[21] Appl. No.: 819,671

[22] Filed: Jan. 17, 1986

[51] Int. Cl.[4] ........................ H01Q 15/14; B32B 5/12; B32B 15/08; B32B 15/04

[52] U.S. Cl. .................................... 428/593; 428/595; 428/624; 428/634; 428/651; 428/113; 428/114; 428/418; 343/18 B; 343/912

[58] Field of Search ..................... 343/912, 909, 18 B; 428/651, 634, 624, 593, 418, 113, 595, 114

[56] References Cited

U.S. PATENT DOCUMENTS

| | | | |
|---|---|---|---|
| 3,716,869 | 2/1973 | Gould, Jr. et al. | 343/779 |
| 3,916,418 | 10/1975 | Erdmann et al. | 343/912 |
| 4,115,177 | 9/1978 | Nelson | 156/245 |
| 4,448,855 | 5/1984 | Senaha et al. | 428/632 |

FOREIGN PATENT DOCUMENTS

| | | |
|---|---|---|
| 2008266 | 9/1971 | Fed. Rep. of Germany . |
| 1544815 | 4/1979 | United Kingdom . |

OTHER PUBLICATIONS

"Radio Frequency Components of Carbon Fiber Reinforced Plastic for Satellite Payloads," *Frequenz*, 35 (1981), 6, pp. 155–162 (with translation).

*Primary Examiner*—Alexander S. Thomas
*Attorney, Agent, or Firm*—Clement A. Berard, Jr.; Robert L. Troike

[57] ABSTRACT

An antenna reflector comprising a face skin of graphite fiber reinforced epoxy (GFRE) material is coated with a layer of chromium. The chromium is then coated with aluminum and a protective coating of silicon dioxide is then deposited over the aluminum. The chromium has a thickness sufficiently thin to provide good coverage of the pores of the GFRE material and to minimize distortion causing poor bond due to differences in the coefficient of thermal expansion of the different materials in the presence of temperature cycles. The aluminum is sufficiently thick to provide good reflecting characteristics to minimize the polarizing effects of the graphite face skins.

9 Claims, 1 Drawing Figure

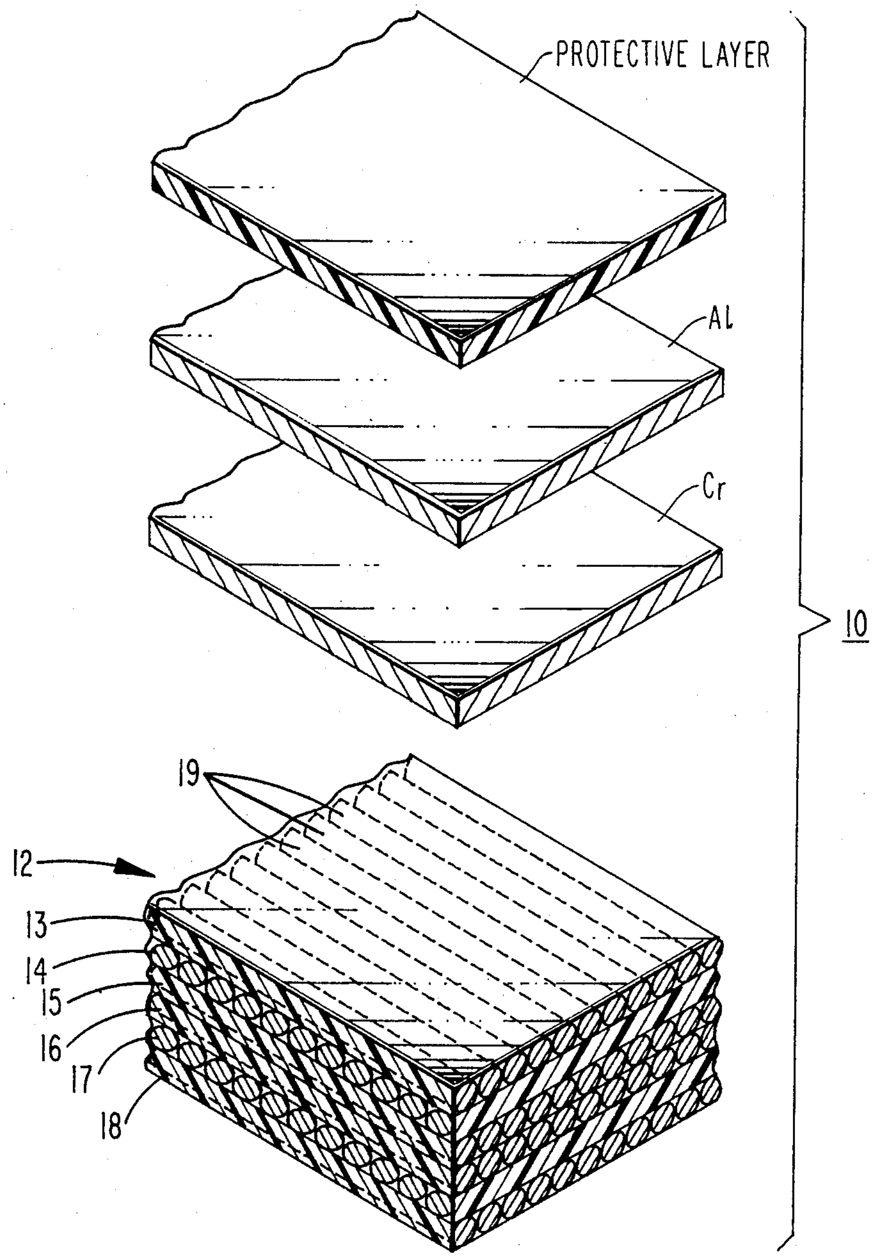
PROTECTIVE LAYER
AL
Cr
10
19
12
13
14
15
16
17
18

ELECTROMAGNETIC RADIATION REFLECTOR STRUCTURE AND METHOD FOR MAKING SAME

This invention relates to structures for reflecting electromagnetic radiation and more particularly, for use in antennas.

Antenna reflectors are widely employed on earth orbiting satellites to facilitate directional receiving and beaming signals to earth. The environment of space can be harsh for such structures and the distortions of the reflectors due to temperature distributions, radiation impingement, and other space related disturbances are of great concern. Certain reflectors are structurally fixed in place close to the support spacecraft and in such cases thermal distortions due to temperature distributions can be minimized by appropriate reflector support structure. These reflectors are often in the shade of the main spacecraft body. The temperature distributions on large deployable reflectors (those which are stored in one position during launch of a spacecraft and deployed to an operating position substantial distances away from the main spacecraft after the spacecraft is in its operating orbit), are severe because the large deployable reflector is fully exposed to the sun and is thermally decoupled from the rest of the spacecraft to a greater degree than the fixed and close to spacecraft reflectors. The resulting thermal distortions of deployable reflectors can be serious and need to be dealt with. One radiation reflector structure which deals with these problems is disclosed in a copending application Ser. No. 521,913, filed Aug. 10, 1983, entitled "Electromagnetic Radiation Reflector Structure," by Raj N. Gounder et al., and assigned to the assignee of the present invention.

The reflector structure disclosed therein comprises multilayers of unidirectional graphite fiber reinforced epoxy (GFRE) tapes to form a solid graphite fiber composite reflector. However, graphite unidirectional fibers, when employed as a reflecting face skin of an electromagnetic radiation reflector tend to polarize the electromagnetic waves due to the parallel arrangement of the graphite fibers. The fibers perform the radiation reflecting whereas the epoxy which binds the fibers into a unified structure, are relatively electromagnetic radiation transparent. This polarization of reflected signals is undesirable in some types of radiation reflectors.

By way of example, this polarization problem of the substrate material is dealt with by providing a reflector surface comprising a grid of copper conductors encapsulated in a Kapton layer. The copper/Kapton grid conductors are bonded to the reflecting surface using an epoxy which is electromagnetic radiation transparent and does not effect the polarization of the reflected signals. An alternate method of dealing with the polarization problem is to apply a plasma flame sprayed aluminum coating. The coating is sprayed on the mold forming the reflector structure. The composite material forming the reflector substrate is then placed on the mold and the aluminum flame sprayed coating is transferred to the composite material. However, in order to adequately coat the composite fibers and provide a transferring of the reflecting coating of aluminum, an aluminum thickness of approximately 10 mils is usually employed. Such a thickness tends to provide thermal incompatibility due to different coefficients of thermal expansion and excessive weight. Thermal distortions of the electromagnetic reflecting surface can therefore occur when reflecting grids or an aluminum flame sprayed coating is incorporated into the reflecting surface design. This occurrence is caused by the presence of a relatively thick (10 mil), high coefficient of thermal expansion (CTE) ($13\times10^{-6}$ in/in/°F.) reflecting coating laminated to a relatively thin (18 mil), low CTE ($0.5\times10^{-6}$ in/in/°F.) composite substrate when operating between large thermal temperature extremes −292° F. and +175° F.).

In a spacecraft, weight needs to be minimized. Deployable reflectors tend to be relatively large, for example, 85 inch diameter, and the use of relatively thick aluminum coatings tends to add considerably to the weight of the structure. The use of copper grid wires on such a reflector also tends to add significantly to the weight of the reflector.

The structure in operation is required to be exposed to thermal cycles between −292° F. and +175° F., with no degradation in the structure. Observation of aluminum coated GFRE structures has revealed significant poor bonding of the materials. A poor bond between aluminum and GFRE is attributed, in part, by the present inventors, to the significant difference in the CTE of the aluminum to the underlying substrate material. For example, the CTE of aluminum is about $13\times10^{-6}$ in/in/°F. as compared to the CTE of the graphite substrate of about $0.5\times10^{-6}$ in/in/°F. It is believed that because of these differences in the CTE of the two materials, thermal cycling causes these materials to expand and contract at different rates and, therefore, may contribute to the separation of the bond between them.

An electromagnetic radiation reflector structure according to the present invention comprises a reflector substrate including a support structure having a face skin comprising a layer of graphite fiber reinforced epoxy (GFRE) material. The graphite fibers in the face skin tend to polarize the electromagnetic wave reflected therefrom. A layer of chromium is deposited on the face skin. The chromium layer has a thickness sufficient to provide a continuous nonporous coating over the face skin and is sufficiently thin to exhibit negligible distortion relative to the face skin in the presence of thermal excursions. A layer of aluminum is deposited on the layer of chromium. The aluminum layer has a thickness sufficient to reflect electromagnetic radiation in a given bandwidth and to minimize the polarizing effect of the graphite fibers.

In the drawing:

The sole FIGURE shows an exploded isometric view of a radiation reflector structure in accordance with the present invention.

In the FIGURE, radiation reflector structure 10 comprises a graphite fiber substrate 12 formed of multiple layers 13, 14, 15, 16, 17, and 18 of unidirectional fibers of graphite reinforced epoxy tapes. This reflector structure is described in more detail in the aforementioned copending application. In the alternative to a substrate 12 comprising a solid graphite fiber structure, the substrate may comprise a honeycomb core structure, as known in the art, having graphite fiber face skins. The latter reflector structure is disclosed in "Optimized Design and Fabrication Processes for Advanced Composite Spacecraft Structures," by Mazzio et al., 17th Aerospace Sciences Meeting, New Orleans, LA, Jan. 15–17, 1979, pages 5–7. In the embodiment of the copending application, the graphite fibers 19 are parallel in a given layer, for example, any of layers 13–18. The fibers of adjacent layers are in different directions to form a quasi-isotropic structure as described in more detail in the aforementioned application. For example, the layers may be oriented at 60° relative to each other [0°/±60°]. The cross-section of layers 13, 14, and 15 may be symmetrical mirror images of the respective layers 16, 17, and 18, as also described more fully in the aforementioned copending patent application.

In the FIGURE, structure 10 includes a layer of chromium which is vapor deposited onto substrate 12. An aluminum coating is vapor deposited on the chromium layer. The aluminum is sufficiently thick to reflect microwave radiation in a given bandwidth, e.g., Ku band. A protective layer, such as silicon dioxide is then vapor deposited over the aluminum coating. The chromium serves as an important intermediate layer which provides a good bond to structure 12. In turn, the aluminum has an excellent bond to the chromium layer, and further the chromium layer minimizes the impact of the differential in the CTE of the substrate 12 to that of the aluminum. Chromium, for example, has a CTE of about $3.4 \times 10^6$ in/in/°F.

Ordinarily, an aluminum layer bonded directly to the face skin of the substrate 12, for example, layer 13, does not reliably bond thereto. This poor bond is attributed, in part, at least, to the differences in CTE between the two materials as discussed above. It is believed that the poor bond of aluminum to graphite may be also due to poor molecular attraction of the materials. Another reason is attributed to surface contamination of the graphite substrate surface. Such contamination includes mold release agents employed in fabricating the graphite substrate and manual handling of the structure. It is believed that the poor bond between the aluminum and the graphite fibers is primarily a chemical incompatibility between the two materials rather than the difference in CTE alone.

Chromium is evaporated onto the substrate 12 by placing chromium elements on Tungsten filaments in a thermal vacuum chamber. Aluminum elements are placed on other of the filaments at the same time. Thirdly, to protect the aluminum coating from the environment, a protective layer of silicon dioxide is applied over the aluminum. The protective silicon dioxide layer is deposited on top of the aluminum in the same thermal vacuum chamber. Silicon material is placed on still other of the Tungsten filaments in the evaporating chamber. Thus, three sets of evaporative Tungsten filaments, one for each coating material, are arranged such as to provide even coverage of the reflecting surface of the substrate. The Tungsten filaments are loaded with the coating materials (chromium, aluminum and silicon) such as to allow the evaporation process of each material to occur independently.

In accordance with one example of the present invention, four graphite epoxy RF antenna reflectors 85 inches in diameter and 0.018 inch thick comprising six plies of unidirectional tape oriented [0/±60] having a smooth parabolic surface were degreased using an acetone wipe and air dried for 30 minutes. It is to be understood in the following description that each reflector was processed separately and independently of the others. An acetone wipe includes an anti-lint cloth soaked in an acetone solution and lightly wiped over the surface of the substrate to remove oils caused by manual handling and mold agents employed in the substrate fabrication process. Each reflector structure was supported in the thermal vacuum chamber 36 inches away from and parallel to the evaporative Tungsten filaments. It should be understood that the reflector substrate 12 includes mounting elements including storage holes, posts, threads, and similar elements for supporting the reflector in a spacecraft and in the thermal vacuum chamber. Backside instrumentation employing thermocouples were coupled to each reflector structure to monitor the reflector temperature during processing to insure its temperatures were within the operating range, for example, below 160° F. Coupons of glass and graphite/epoxy laminates were attached to the edge of the reflecting substrate to provide mechanical measurement of the surface coating thickness and RF and thermal property measurement.

The chamber was evacuated to $1 \times 10^{-5}$ torr. After achieving the desired vacuum, the chamber was further pumped for a minimum of 12 hours to ensure outgassing of moisture within the chamber and reflecting substrate. Current, 30 amps at 120 volts, was applied to the chromium bearing Tungsten filaments. A Quartz Crystal Microbalance (QCM) was monitored to determine when a coating thickness of 600±100Å was achieved.

The Quartz Crystal Microbalance is a digital readout instrument which determines the thickness of material. The instrument is placed in line of sight of the evaporated coatings in the same plane as the reflector surface being coated. The evaporating coatings are deposited on the QCM at the same time they are deposited on the reflector surface. Current is passed through the instrument and the instrument provides a measurement of the thickness of the deposited coating. This instrument is widely employed in the art of thin film technology.

Maximum processing temperature of each reflector during the chromium evaporation process was 100° F. A current of 30 amps at 120 volts was then applied to the aluminum bearing Tungsten filaments and the QCM was monitored until a surface coating thickness of 6,000±1,000Å was achieved. Reflector temperatures increased to 140° F. during the aluminum deposition. Final coating application of silicon oxide $SiO_2$ was achieved by increasing the pressure of the chamber to $1 \times 10^{-3}$ torr by introducing oxygen into the chamber during the evaporation of the silicon. A current of 30 amps at 120 volts was used during the silicon dioxide deposition with a maximum processing temperature of 156° F. Each reflecting shell was allowed to cool to 100° F. prior to returning the chamber and reflector to atmospheric pressure.

Inspection of the reflecting surface showed a consistent coating with measurements of the test coupons within the thickness ranges described herein. Mechanical measurement of the coatings on the test coupons was made by a Tally-Surf stylus measurement instrument. The Tally-Surf stylus measurement instrument is one which employs a mechanical probe and is also used in thin film technology.

Following integration of each antenna reflector to its signal feed system, RF testing showed the reflecting coating to perform as well as a solid aluminum shell. No degradation was observed when the test coupons were thermally cycled between −292° F. and +175° F. for 1,000 cycles and a reflector shell was exposed to 20 cycles. Irradiation of the coupons using Gamma rays to end-of-life exposure, $1 \times 10^8$ rads, did not produce any sign of coating degradation. RF and thermal optical properties tests and evaluations were performed on the coupons and the four reflectors both prior to and post environmental exposure. Atmospheric exposure in a controlled storage area 70±10° F. and 50±20% relative humidity (RH) for 400+ days did not produce any sign of observable surface degradation on any of the coupons or the four coated reflector units.

The coated reflector surfaces were then visually inspected. The visual inspection included a peel test in which an adhesive tape is applied to the coating and the tape is then pulled from the surface being tested. Any coating which adheres to the tape rather than to the reflector substrate is defective. The test units all passed the visual inspection.

To determine the exact placement of the reflector relative to the evaporation Tungsten filaments, a glass parabolic reflector of the same shape and dimensions as the four reflectors was placed in the chamber and was repeatedly deposited with coatings until the coatings were uniform. The tests showed that the evaporated filaments were required to be placed close together in the central region of the structure and spaced more widely apart toward the perimeter of the reflector structure. The Tungsten filaments in the chamber boil the chromium, aluminum, or silicon attached thereto, vaporizing the material producing a mist. The evaporated mist migrates to the substrate being coated, providing a uniform coating.

In the test performed, coupons of the reflector substrate design were employed in order to determine a realistic life exposure of 1,000 thermal cycles. The reflectors were subjected to 20 thermal test cycles due to the extreme cost of such testing. For example, a 20-cycle test of subjecting a reflector to a temperature range between −290° and +175° F. costs approximately $80,000 and takes approximately four weeks of testing time.

Two of the test models were for use in actual spacecraft and two of the test models were for test and qualification. The coatings on all four structures passed the thermal and electrical tests.

The chromium was coated to a thickness of 600±100Å and this thickness is critical. A thickness below 400Å was found to not completely cover the graphite fibers due to the porosity of the fiber epoxy surface providing a discontinuous surface in the chromium layer. The ideal thickness was determined to be about 600±100Å. The lower value thickness tended to produce a discontinuous layer which tended to create poor adhesion of the subsequent deposited aluminum layer. Therefore, too thin a layer of the chromium does not provide an adequate intermediate bond for the subsequent aluminum coating. One detrimental factor in making the chromium thickness greater than 700Å is the additional weight. A second detrimental factor is that such a thickness tends to increase dramatically the thermal stress failure of the coatings due to the difference in coefficients of thermal expansion of the chromium relative to the graphite fibers and relative to aluminum coating.

In the disclosed process the Tungsten filaments in a thermal vacuum chamber were found to be optimum for coating a reflector structure of such large dimensions as mentioned above. An electron gun employed in a laboratory setting for bombarding a substrate with the materials to be coated, may be employed for smaller structures but is not practical for an 85 inch diameter reflector.

In the aforementioned patent application, at page 11, the problem of bonding of the aluminum layer to the graphite substrate is discussed. A solution proposed includes a titanium layer having a thickness of about 100Å coated with an aluminum layer of a thickness of about 5,000Å. However, a problem exists with coating the reflector structure with titanium. In an evaporated process the reflector structure is placed in a thermal vacuum chamber spaced from and parallel to the Tungsten evaporating filaments. These filaments are heated by an electric current to a temperature sufficient to evaporate metals attached to the filaments. However, the evaporation of titanium with Tungsten filaments create a chemical reaction between the two materials. This reaction tends to seriously effect the ability of the filaments to evaporate the titanium onto the substrate in the chamber.

Other materials were tested as an interface between the aluminum and the graphite fibers in an effort to improve the bonding thereof. For example, a carbonized material was tested. It was observed that the carbonized material, however, tended to deteriorate the Tungsten heating filaments boiling off the metal surface thereof. The result was a rough deposited coating and the carbon fibers in the substrate being coated were loosened. A refractory metal such as molybdenum tends to be too heavy for application on a spacecraft reflector.

Ideally, the reflector substrate coated only with an aluminum coating would be sufficient to resolve the electrical reflecting problems caused by the polarizing effects of the graphite fibers. However, the poor bond of aluminum directly to the substrate creates the need for the intermediate bonding layer.

Tests employing carbon, titanium, and Tungsten materials as an intermediate material revealed poor peel, poor adhesion, and the differences in the CTEs of the different materials made significant contributions to deterioration of the combined structure even when the intermediate materials had a thickness of around 600Å. Titanium, while the best of the prior tried materials, from a practical implementation, is not generally applicable for large scale operation employing a filament evaporation for the reasons given. Tungsten filaments are the only present acceptable filament materials employed for thermal evaporation of metals. This technique employs high power and low voltage to evaporate the metals of interest. The Tungsten is required to carry the applicable currents. Therefore, in a practical implementation, chromium is the only material that the present inventors found which meets all of the criteria for providing an intermediary between the aluminum coating and the graphite substrate.

What is claimed is:

1. A reflector structure for electromagnetic radiation comprising:

a reflector substrate comprising a support structure including a face skin comprising a layer of graphite fibers reinforced epoxy (GFRE) material, said graphite fibers in said face skin tending to polarize electromagnetic waves reflected therefrom;

a deposited layer of chromium on said face skin, said layer having a thickness sufficient to provide a continuous nonporous coating over said face skin and sufficiently thin to exhibit negligible distortion relative to the face skin in the presence of thermal excursions; and a deposited layer of aluminum on said layer of chromium, said aluminum layer having a thickness sufficient to reflect electromagnetic radiation in a given bandwidth and sufficient to minimize the polarizing effect of the polarizing fibers.

2. The structure of claim 1 further including a protecting coating over said aluminum layer.

3. The structure of claim 1 wherein said chromium has a thickness in the range of about 400–700Å and the aluminum has a thickness in the order of about ten times the thickness of the chromium.

4. The structure of claim 1 wherein said reflector substrate comprises multiple layers of unidirectional GFRE tapes.

5. The structure of claim 1 wherein said chromium and aluminum are vapor deposited on said face skin.

6. The structure of claim 5 wherein the substrate comprises multiple layers each of parallel unidirectional graphite fibers in which the layers are oriented to form a quasi-isotropic solid structure.

7. The structure of claim 6 wherein the layers are oriented [0°/±60°].

8. The structure of claim I wherein said substrate is a section of a surface of revolution.

9. The structure of claim 1 wherein said substrate is a section of a parabola and comprises a solid sheet of multilayers of graphite fiber reinforced epoxy material.

* * * * *